Dec. 1, 1953 H. JAFFE 2,661,433

PIEZOELECTRIC DEVICE

Filed May 14, 1951 3 Sheets-Sheet 1

INVENTOR.
HANS JAFFE
BY
Harries A. Munn, Jr.
ATTORNEY

Dec. 1, 1953

H. JAFFE 2,661,433

PIEZOELECTRIC DEVICE

Filed May 14, 1951

3 Sheets-Sheet 2

INVENTOR.
HANS JAFFE
BY
Harries A. Mumma Jr.
ATTORNEY

Dec. 1, 1953 H. JAFFE 2,661,433

PIEZOELECTRIC DEVICE

Filed May 14, 1951 3 Sheets-Sheet 3

INVENTOR.
HANS JAFFE
BY Harries A. Mumma, Jr.
ATTORNEY

Patented Dec. 1, 1953

2,661,433

UNITED STATES PATENT OFFICE 2,661,433

PIEZOELECTRIC DEVICE

Hans Jaffe, Cleveland Heights, Ohio, assignor, by mesne assignments, to Clevite Corporation, Cleveland, Ohio, a corporation of Ohio Application May 14, 1951, Serial No. 226,182

8 Claims. (Cl. 310—8.1)

This invention relates to piezoelectric devices, and more particularly to such a device comprising a piezoelectrically sensitive section cut from a single crystal of a material heretofore unknown in the piezoelectric art.

Sorbitol hexaacetate, $CH_3.CO.O.CH_2(CH.O.CO.CH_3)_4CH_2.O.CO.CH_3$ is an article of commerce and ordinarily is available in the form of small crystallites. It has a melting point of 98–100° C., and it may be produced by the complete esterification of sorbitol by means of acetic acid or acetic anhydride. Sorbitol is optically active and is one of a number of isomeric hexanehexols, certain others of which likewise are optically active but which may be distinguished from sorbitol by the extent of their optical activity and by other physical as well as chemical properties, thus permitting the unambiguous identification of sorbitol and also of its hexaacetate ester. Isomeric hexaacetate esters of these hexanehexols also may be distinguished by their characteristic crystal structures.

As is the case with other optically active compounds, sorbitol exists in two enantiomorphic forms known individually as *d*-sorbitol and *l*-sorbitol. The term sorbitol sometimes is restricted to the *d*-form, in which case both forms have been referred to as glucitols. The *d*-sorbitol form, also called *d*-glucitol, is obtained by reduction of *d*-glucose, which is the commonly occurring form of glucose. Accordingly, the invention described hereinbelow preferably utilizes crystals of *d*-sorbitol hexaacetate. Crystals of *l*-sorbitol hexaacetate, also called *l*-glucitol hexaacetate, exhibit the same properties, including any piezoelectric responses, as those of the *d*-form except for a reversal of the electric polarity. The term sorbitol hexaacetate is used in this specification and in the appended claims to identify either of the two enantiomorphic esters. Mixtures of the *d*- and the *l*- forms should be avoided in growing crystals to be used in accordance with the invention described hereinbelow.

Observation of crystallites of the commercially available sorbitol hexaacetate might give some indication of the crystalline structure characteristic of this substance. Moreover, it now has been found possible to produce sizable single crystals of sorbitol hexaacetate, and these crystals have been identified as belonging to the crystal class known as the hemimorphic or polar class of the monoclinic system, also designated class $C_2$. From this determination of crystal symmetry, it could be stated on theoretical grounds that piezoelectric responses of this crystal substance are not prohibited by the symmetry characteristics of the crystalline material. In general, however, it has not been found possible to predict theoretically the magnitude of any such responses, which may be substantially zero or entirely negligible in any particular case. Consequently the practical utility of sorbitol hexaacetate in the piezoelectric art still was entirely unknown even after the first sizable single crystals of the substance had been grown.

Accordingly, it is an object of the invention to provide a piezoelectric device comprising a piezoelectrically sensitive section cut from a single crystal and having novel and useful piezoelectric properties.

It is another object of the invention to provide a new and improved piezoelectric device comprising a piezoelectrically sensitive section cut from a crystalline material of low solubility in water and which is stable to temperatures higher than those usually encountered during the operation of such devices.

It is a further object of the invention to provide a new and improved piezoelectric device comprising a piezoelectrically sensitive resonant section having a desirably low frequency-temperature coefficient.

It is yet another object of the invention to provide a new and improved piezoelectric device comprising a synthetic crystal plate having a high piezoelectric response in a thickness-shear mode.

In accordance with the invention, a piezoelectric device comprises a piezoelectrically sensitive section having a pair of opposed electroded surfaces and cut from a single crystal of sorbitol hexaacetate.

For a better understanding of the present invention, together with other and further objects thereof, reference is had to the following description taken in connection with the accompanying drawings, and its scope will be pointed out in the appended claims.

Figures 2, 3:
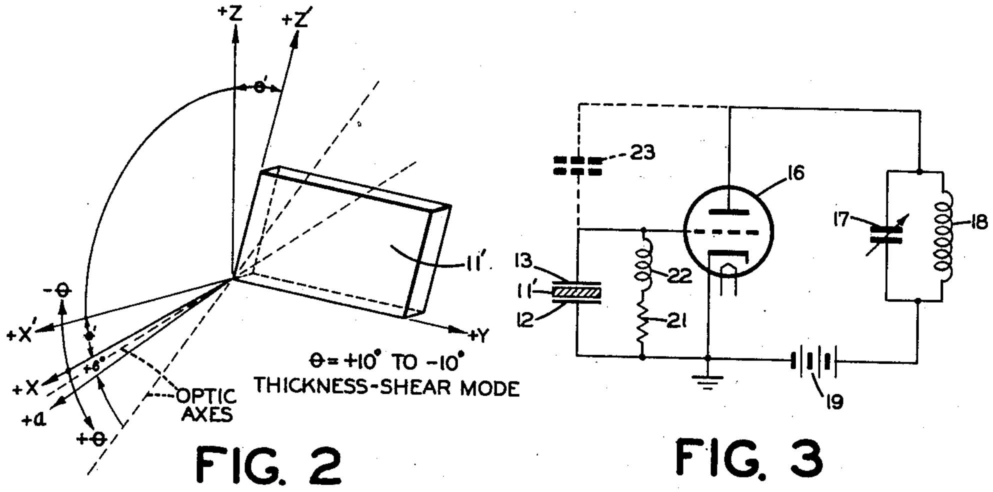
Fig. 2 is a representation in the same perspective as that of Fig. 1 of a thin plate cut from the crystal of Fig. 1 and having a crystallographic orientation within a predetermined range.
Fig. 3 is a schematic circuit diagram representing an oscillator which includes a resonator crystal section of a type represented in Fig. 2.
Figure 7:
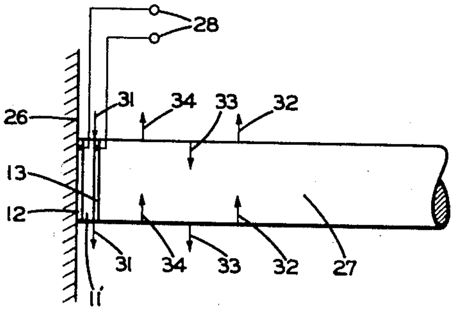
Figure 4:
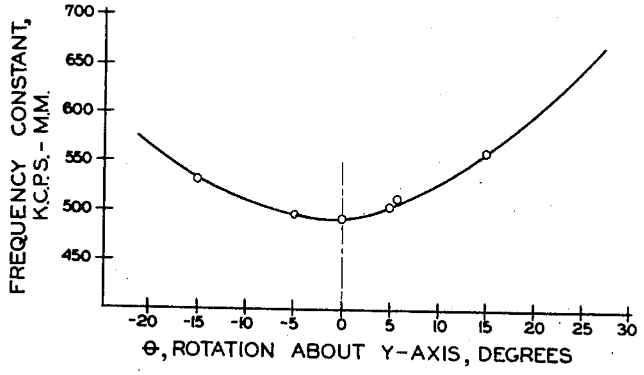
Figure 5:
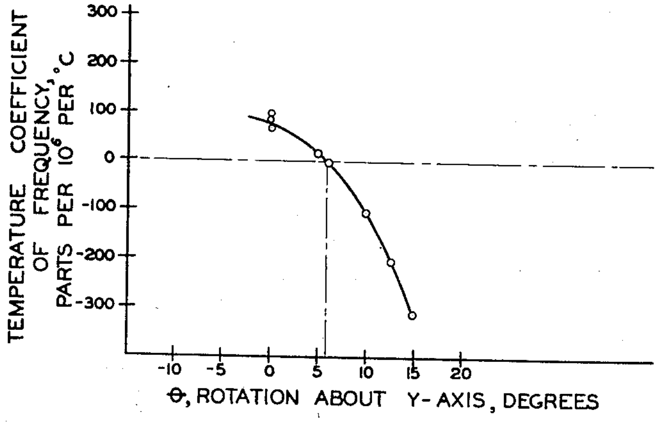
Figure 6:
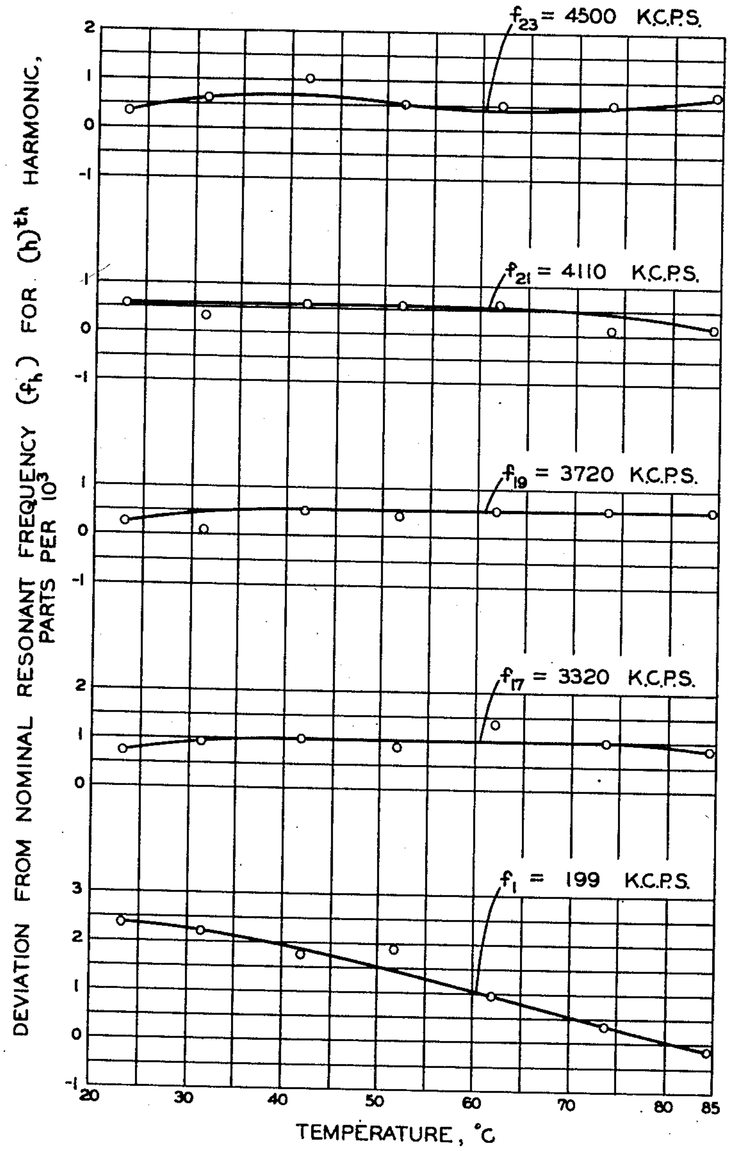

Figs. 4, 5, and 6 are graphical representations of certain properties of crystal plates of the type represented in Fig. 2; and Fig. 7 is a view, partly schematic, of a transducer device comprising such a piezoelectrically sensitive crystal section.

Figure 1:
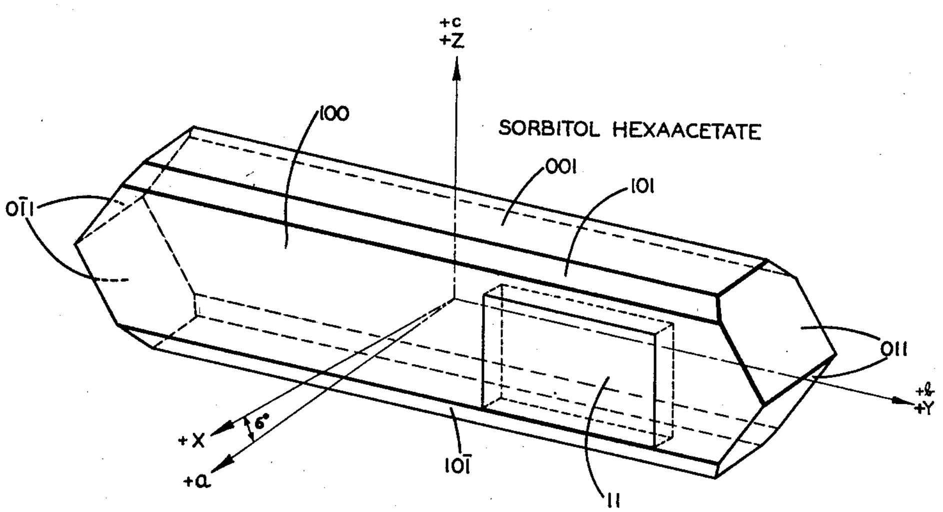
Fig. 1 is a perspective view of a typical single crystal of sorbitol hexaacetate which is useful in a piezoelectric device in accordance with the invention.

Referring to Fig. 1, there is represented in perspective a single crystal of sorbitol hexaacetate with relation to crystallographic axes *a*, *b*, and *c*. The crystallographic axes *b* and *c* are made to coincide with the respective coordinate axes Y and Z in the manner which has become conventional in representing monoclinic crystals. The positive directions of the crystallographic and coordinate axes are represented by arrows. It will be observed from Fig. 1 that the crystallographic $+a$-axis makes an angle of essentially 6° with the coordinate +X-axis, this angle in the XZ-plane being positive in accordance with convention, since it is taken counterclockwise from the +X-axis as viewed looking into the positive direction of the Y-axis.

The crystallographic indices of various crystal faces are indicated in Fig. 1. The (001) faces usually are narrower than the (100) faces, and are joined at each end of the crystal by two wedges of the crystallographic form (011) forming a sphenoid with an angle of 67.7° between each pair of wedges. The (101) form also appears. Also indicated in outline in the crystal of Fig. 1 is a thin crystal slice or section 11 having a major surface in the (100) face of the single crystal, that is, parallel to the Y- and Z-axes.

The orientation of useful thin plates or sections of the type of section 11 is indicated more generally in the view of Fig. 2, where the crystal section is seen to be a rectangular plate cut from the crystal of Fig. 1 with its major surfaces parallel to the Y-axis. However, as indicated in Fig. 2, a moderate rotation of the crystal plate about an edge parallel to the Y-axis is permissible in many cases. In such cases, of course, the major surfaces of the rotated section, which is designated generally as 11′ in Fig. 2, no longer coincide with a YZ-plane, and the edges of the rectangular plate 11′ which formerly coincided with the direction of the Z-axis are moved through an angle $\theta'$ into a new direction, arbitrarily designated Z′. The normal to the major surfaces of the plate 11 in Fig. 1 extends in the X-direction. In Fig. 2 it will be seen that the normal is moved through the angle $\theta'$ to a new direction, designated X′.

Merely for purposes of illustration, the angle $\theta'$ in Fig. 2 has been shown taken in a clockwise or negative direction from the X-axis. Rotations about the Y-axis of the crystal plate 11′ are indicated more generally in Fig. 2 by arrows designated $+\theta$ and $-\theta$. For a specific angle $\theta'=+6°$, it follows that the direction X′ of the normal to the major surfaces of the crystal section coincides with the *a*-axis. The two optic axes of the sorbitol hexaacetate crystal also lie in the XZ-plane, as represented by dashed lines in Fig. 2. It may be helpful for identifying the crystallographic axes to point out that the *b*-axis is the polar axis, while the two optic axes lie in the *ac*-plane with one in the acute angle between the *a*- and *c*-axes and the other quite near the X-axis.

A piezoelectric device in accordance with the invention comprises a piezoelectrically sensitive section, such as the section 11′ of Fig. 2, having a pair of opposed electroded surfaces and cut from a single crystal of sorbitol hexaacetate. As shown schematically in the circuit diagram of Fig. 3, the crystal 11′ appears with individual electrodes 12 and 13 represented on its two major surfaces. These two electroded surfaces, which ordinarily are the major surfaces of the section, lie in planes identified generally as YZ′-planes using the notation of Fig. 2. More specific information regarding the preferred orientation of the section 11′, when used in the circuit of Fig. 3, appears hereinbelow.

Referring again to Fig. 2, it is noted that the electroded major surfaces of the section 11′, which constitute the pair of opposed electroded surfaces 12, 13 as represented in Fig. 3, are oriented substantially parallel to the Y-axis of the crystalline substance. Furthermore, it is preferred that the normal to the plane of each of these electroded surfaces be inclined not more than 10° from the X-axis of the crystalline substance. In other words, it is preferred that the angle $\theta$ of Fig. 2 have a value between the limits of +10° and −10°. In general, crystal sections having crystallographic orientations within this preferred range exhibit piezoelectric responses of similar magnitudes, and these responses are particularly strong and otherwise useful, as will appear hereinbelow.

In particular, however, it may be especially desirable that the normal to the plane of each of the electroded surfaces not only be inclined not more than 10° from the X-axis, but also substantially coincide with the X-axis, as is the case with the section 11 illustrated in outline in Fig. 1. This section may be called an X-cut section, for which the angle $\theta$ is, of course, zero.

Referring to Fig. 4, there is shown graphically a curve the abscissas of which represent the angular rotation $\theta$ about the Y-axis for plates oriented as depicted in Fig. 2 and the ordinates of which represent the frequency constant of the fundamental thickness-shear mode resonance for such a crystal section having its electroded faces oriented substantially parallel to the Y-axis. It is seen that the frequency constant is a minimum for the section with the normal substantially coinciding with the X-axis, in which case $\theta$ is zero. As an example, a rectangular X-cut section having a length of 12.72 mm. in the Y-direction, a width of 5.26 mm. in the Z-direction, and a thickness of 2.23 mm. in the X-direction has a fundamental resonant frequency of 220 kcps. in the thickness-shear mode. The mode of motion contemplated involves shear strains around the Z-axis, accompanied by shearing distortions of the narrow edge surfaces of the crystal plate which are parallel to the Y-axis. These shearing distortions occur in the surfaces normal to the Z′-direction as seen in Fig. 2. This mode of motion is controlled primarily by the thickness dimension, and the frequency constant has an unusually low value, specifically 491 kcps.-mm. for the X-cut section.

When rectangular sections of sorbitol hexaacetate are cut for angles Θ differing in either sense from that of the X-cut section, it is found that the frequency constant increases, as shown in Fig. 4. One significance of the minimum frequency constant exhibited by X-cut sections is that such sections can be expected to display a thickness-shear mode of motion having a minimum cross-coupling to other modes of motion. This is advantageous for stability of operation of piezoelectric devices and for the lack of dependence of vibration and resonance effects upon the dimensions of the section other than in the X-direction.

Other crystal sections of the type represented in Fig. 2 also may have particular advantages. Specifically, it may be especially advantageous in many cases to cut the crystal section with the normal to the plane of the electroded surfaces inclined substantially +6° from the X-axis of the crystalline substance. In such a case the angle Θ equals +6°, and the normal to the electroded surfaces substantially coincides with the crystallographic *a*-axis. An advantage of such a section is apparent from the graph of Fig. 5.

In Fig. 5 there is shown graphically a curve representing some additional properties of sorbitol hexaacetate crystal sections having a pair of opposed electroded surfaces oriented substantially parallel to the Y-axis. The abscissas of the curve of Fig. 5 again represent the angular rotation Θ about the Y-axis from the position in which the normal to the plane of each of the electroded surfaces coincides with the X-axis. The ordinates of the curve of Fig. 5 represent the temperature coefficient of resonant frequency in parts per million per degree C. for the thickness-shear mode, between about 25–80° C.

It will be seen from the curve of Fig. 5 that changes of several degrees in the angle Θ result in substantial changes in the temperature-frequency characteristic. The curve indicates that crystal sections having the orientation for which Θ=+6° may be expected to exhibit a temperature coefficient of resonant frequency which is substantially zero over a remarkably wide range of temperature. This characteristic of one such plate is illustrated in detail in Fig. 6.

Referring to Fig. 6, there are shown five curves representing a number of harmonics of the resonant frequency for the thickness-shear mode of motion. The abscissas of these curves are temperatures, represented on a common scale. The ordinates are deviations from nominal resonant frequencies of the 1st or fundamental, 17th, 19th, 21st, and 23rd harmonics, each drawn with an individual scale representing deviation in parts per thousand (cycles per kilocycle) from an arbitrary nominal frequency chosen just lower than the resonant frequency actually measured. These curves give the results of tests made upon a crystal section for which Θ=+6°, as represented in Fig. 2.

The plate tested as reported in Fig. 6 had a length dimension of 16.91 mm. in the Y-direction, a width dimension of 11.73 mm. in the Z′-direction, and a thickness dimension of 2.63 mm. in the X′-direction, the latter coinciding with the *a*-direction. The frequency constant with respect to the thickness dimension is about 515 kcps.-mm., calculated using any of the higher resonant frequencies divided by the number of the harmonic. It appears from Fig. 6 that the resonant frequency for each of the higher harmonics varies only very slightly over a large range of temperatures between room temperature and 85° C. Since single crystals of this substance appear to be stable at temperatures as high as 90° C. and are satisfactory for continuous operation in piezoelectric devices at temperatures of at least 75° C., it will be evident that crystal sections having the specified orientation with Θ=+6° are particularly attractive for use in frequency-controlling devices.

It is noted that the fundamental resonant frequency decreases for the section in question by about 2.5 parts per 1000 between 25° and 85° C. This variation is minimized if the dimensions of the crystal plate are such that the wavelength of the shear mode vibrations in the crystal under consideration is small compared to the lateral dimensions. This condition is realized either by choosing the length dimension in the direction of the Y-axis larger compared to the thickness if the fundamental resonance is to be utilized, or by utilizing higher harmonics, as shown in Fig. 6. The ratio of length to thickness is only about 6.5:1 for the crystal section tested. Moreover, it is noted that the deviation of frequency for the fundamental resonance, although substantial for the plate tested, is nearly linear with frequency, and the curve for the fundamental may be leveled even for the length-thickness ratio in question by choosing a somewhat smaller rotation angle Θ such as 3°.

A suitable section, such as the section 11′ having the angular inclination Θ=+6° from the X-cut section, advantageously may be incorporated as a resonator element in a frequency-selective piezoelectric device. A frequency-selective device of this type may be illustrated by the oscillator device shown schematically in Fig. 3. The electrodes or electroded surfaces 12 and 13 may be provided on the faces of the crystal section 11′ in any convenient manner for incorporation in the illustrated oscillator device. For example, various methods of applying thin coatings or layers of metal or other conductive material are well known. Alternatively, a crystal holder may be used which provides an air gap between the electrode and the crystal surface. It will be understood that the term "electroded surface," as used in this specification and in the appended claims, is intended to include an electrode arranged so as to be spaced by an air gap from the crystal surface and closely capacitively coupled thereto, as frequently practiced in the piezoelectric art.

The remainder of the device of Fig. 3 comprises electrical oscillatory circuit means for exciting the resonator section 11′ so as to utilize the frequency-selective characteristics thereof. This oscillator circuit is a crystal-controlled circuit of a modified tuned-plate, tuned-grid type having a triode vacuum tube 16. The tuned-plate portion of the circuit includes a variable capacitor 17 suitable for resonating a parallel inductor 18. The parallel resonant circuit 17, 18 is connected in the anode-cathode circuit of the triode 16 with a source of anode potential 19 inserted between the resonant circuit and the grounded cathode of the triode. The essential element of the tuned-grid portion of the circuit is the crystal resonator 11′, the electrodes 12 and 13 of which are connected to the cathode and control electrodes respectively of the triode 16. The crystal element 11′ is shunted by a resistor 21 and a series choke inductor 22 to provide a suitable bias voltage. A capacitor 23 may be connected between the anode and control electrodes of the triode 16, but this capacitor is shown in dotted lines because the interelectrode capacitance of the triode ordinarily supplies the desired regenerative coupling between these electrodes.

In the operation of the circuit of Fig. 3, the capacitor 17 may be adjusted so that the circuit 17, 18 resonates at a frequency which is at or near the frequency of a thickness-shear resonance of the section 11'. Any excitation in the anode-cathode circuit of the triode 16 tends to produce oscillations at the frequency of resonance of the tuned circuit 17, 18. The resulting oscillatory voltage appears across the capacitance 23 and the impedance of the crystal element 11', and stabilizes at such a frequency that it is applied regeneratively to the control-electrode circuit of the triode. This tends to set up oscillations, the frequency of which is determined in a well-known manner by the steep impedance-frequency characteristic of the crystal element 11' in the neighborhood of a resonant frequency thereof. If the element 11' exhibits a negligible temperature coefficient of frequency over the range of temperatures encountered during operation of the device, as is the case with suitable elements such as the sections described above for which the angle $\Theta$ equals about $+6°$, a practically constant resonant frequency is achieved. It is noted that these crystals may be excited readily at high harmonic frequencies of the thickness-shear mode resonance with excellent frequency stability, the 51st harmonic having been observed.

The particular usefulness of the crystal sections represented in Fig. 2 is apparent from the unusually high value of the piezoelectric coefficient governing the so-called thickness-shear response of X-cut sections, this coefficient $d_{16}$ having a value greater than $25\times10^{-12}$ meters per volt. The coupling coefficient for the X-cut thickness-shear mode is about 0.17. In the case of a thickness-shear mode the coupling coefficient is related to the ratio of series capacitance $C_s$ to parallel capacitance $C_p$ in the well-known equivalent circuit for piezoelectric crystal plates by the formula $$(\text{coupling coefficient})^2=(\pi^2/8)\ (C_s/C_p)$$

However, the thickness-shear response of crystal sections electroded so as to obtain an electrical signal field roughly in the direction of the X-axis is not the only piezoelectric response obtainable with sorbitol hexaacetate crystals. X-cut sections also exhibit a response in the so-called face-shear mode of motion. The piezoelectric coefficient $d_{14}$ for this mode of motion has a value of about $2.4\times10^{-12}$ meters per volt. The face-shear mode of the X-cut section has a frequency constant of about 1100 kcps.-mm. From the value of the piezoelectric coefficient, it will be seen that this mode is not very strongly excited, although substantial resonant responses for this mode can be obtained at frequencies as high as those of the fifth or seventh harmonic.

Other cuts of sorbitol hexaacetate also may be useful, for example Z-cut crystal sections. Such sections usually have the thickness direction in the general direction of the Z-axis and are electroded to utilize electric fields in the latter direction. The piezoelectric coefficients for such Z-cut sections have the approximate values $$d_{34}=2.4\times10^{-12} \text{ and } d_{36}=2.0\times10^{-12}$$

meters per volt; these coefficients represent the response of Z-cut sections in the thickness-shear and face-shear modes respectively. It may be noted that the face-shear mode for the Z-cut sections involves a shear about the Z-axis, which also is the case with the thickness-shear mode of the X-cut sections. Thus the same elastic properties of the crystal are involved in the two cases, and the advantageous properties represented by the graphs of Figs. 4 and 5 may be realized also with generally Z-cut sections. However, the shear mode response of the type under discussion is strongly excited when the electrical signal fields are oriented in the general direction of the X-axis, as discussed hereinabove in connection with Figs. 2 and 3, while the relatively low value of the $d_{36}$ coefficient indicates only weak excitation of such a mode of motion when the electrical field is in the general direction of the Z-axis.

In addition, substantial and useful piezoelectric responses may be obtained in Y-cut sections of sorbitol hexaacetate. Piezoelectric devices comprising sections electroded so as to provide useful electrical signal fields in the approximate direction of the Y-axis are disclosed and claimed in application Ser. No. 226,140, filed concurrently herewith in the name of James E. Mumper and assigned to the same assignee as the present invention.

It will appear from the discussion hereinabove that the piezoelectric properties of sorbitol hexaacetate make this crystalline material particularly attractive for incorporation in frequency-controlling devices. However, the strong excitation of the thickness-shear mode in crystal sections of the type designated 11' in Fig. 2 also make such sections usefully operative in transducer devices of the type illustrated in Fig. 7, which is a partially schematic representation of a piezoelectric device for transducing between the types of energy which are classified as electrical and mechanical. Such a device may be used for transducing from electrical energy to mechanical energy, or vice versa.

The device of Fig. 7 also utilizes a piezoelectrically sensitive section 11' cut from a single crystal of sorbitol hexaacetate. This section is seen in Fig. 7 mounted as if looking at the narrow upper surface of the section 11' as shown in Fig. 2. In other words, the front surface of the section 11' as seen in Fig. 7 is perpendicular to the Z'-axis shown in Fig. 2. The electroded surface 12 of the section 11' is fastened securely to a supporting surface 26. The other electroded surface 13 of the section 11' is fastened securely to a solid rod 27, only the left hand end portion of which is shown in the drawings. A pair of terminals 28 is connected to the individual electrodes 12 and 13.

The device of Fig. 7 may be arranged to transduce from electrical to mechanical energy by connecting to the terminals 28 the output circuit of an electrical signal generator, not shown, for example an ultrasonic frequency signal generator. The resulting electrical field developed in the direction of the X' axis of the crystalline substance causes shear distortions of the X'Y planes within the section 11'. Such a distortion at a given instant appears as a downward motion of the unmounted or right hand face of the section 11', as represented in Fig. 6 by the arrows 31. These shear motions alternate upward and downward as seen in Fig. 7 and propagate to the right along the rod 27. There also appear in Fig. 7 several additional sets of arrows 32, 33, and 34, representing for the given instant the positions of regions of maximum deformation in upward and downward directions due to motion of the element 11' which occurred prior to that represented by the arrows 31. These additional sets of arrows, of course, are spaced one-half wavelength apart along the rod, the wavelength being determined by the velocity of propagation of shear mode ultrasonic energy along the rod 27.

Thus the terminals 28 and the electrical circuit apparatus connected thereto, together with the electrodes 12 and 13 and the interconnecting wires, constitute means for applying to the crystal section 11' energy of one of the two types mentioned hereinabove, in this case electrical energy. The mounting surface 26, the rod 27, and the arrangement fastening the section 11' between the surface 26 and the rod 27 constitute means dependent upon the effect of the applied energy uopn the crystal section 11' for deriving and utilizing energy of the other type, that is, mechanical energy. This mechanical energy is derived in the form of shear deformations, propagating along the rod 27 as described above, and the propagation of the ultrasonic energy along the rod 27 is a utilization of the mechanical energy so derived. The ultimate utilization of the mechanical energy may be the testing of the rod 27 for flaws. The energy propagated along the rod 27 may be reflected from the distant right hand end of the rod, not shown, and thus return to the left hand end after the round trip time of propagation of the energy along the rod has elapsed. For this purpose the vibrational energy should be developed in the rod in short pulses of ultrasonic frequency energy, which can be generated in a well known manner. If reflected pulses appear at the left end of the rod before this round trip period of time has elapsed, a structural flaw in the rod is indicated.

In another application of the Fig. 7 device, the rod 27, of predetermined length and elastic properties, may be used as a mechanical delay line for storing energy during the period of time required for round trip propagation of shear vibrations along the rod. It is noted that the section 11' is piezoelectrically sensitive to a thickness-shear mode of motion of the crystal section, and that the mechanical energy transduced in the device of Fig. 7 is associated with motion of the crystal section 11' in a thickness-shear mode.

In the utilizations just discussed of the piezoelectric device of Fig. 7, it was implied that shear vibrations propagating in the leftward direction along the rod 27 may be picked up by the element 11'. In this case the rod 27 and its mechanical connection to the mounted crystal section constitute means for applying mechanical energy to the section, wherein this energy is transduced to electrical signal energy. Suitable electrical receiving and display apparatus, well known in the art, may be connected across the terminals 28, in which case such apparatus, together with the electrodes 12 and 13 and the interconnecting wiring, constitutes means dependent upon the effect of the applied mechanical energy for deriving and utilizing electrical energy.

The preparation of a sizable single crystal of sorbital hexaacetate, such as that illustrated in Fig. 1, presents no very unusual difficulties to those skilled in the art. The solubility of this substance in water is quite low, which is an advantage since crystal plates thereof are not subject to rapid attack by atmospheric moisture. Substantial amounts of sorbitol hexaacetate, however, may be dissolved at somewhat elevated temperatures in substantially anhydrous acetic acid, which may be diluted with water up to about 50% of the volume of acetic acid. A seed crystal of the substance is placed in the solution, which is rocked gently to bathe the surfaces of the growing crystal in a solution of uniform composition. The temperature of the solution is lowered slowly to cause moderate supersaturation of the solution with reference to the crystal faces. As an example, a saturated solution in two liters of glacial acetic acid deposits about 115 grams of crystalline substance with a temperature drop of 7° C. After the crystal has grown to the desired dimensions, it conveniently may be cut into rough sections by the use of a string saw, the string being passed through methanol, which acts as a solvent. The rough sections then are milled to the desired dimensions. It is noted that crystals of this substance exhibit perfect cleavage along the (100) plane.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. A piezoelectric device comprising: a piezoelectrically sensitive section having a pair of opposed electroded surfaces and cut from a single crystal of sorbitol hexaacetate.

2. A piezoelectric device comprising: a piezoelectrically sensitive section, cut from a single crystal of sorbitol hexaacetate, and having a pair of opposed electroded surfaces oriented substantially parallel to the Y-axis of the crystalline substance and with the normal to the plane of each of said surfaces inclined not more than 10° from the X-axis of the crystalline substance.

3. A piezoelectric device comprising: a piezoelectrically sensitive section, cut from a single crystal of sorbitol hexaacetate, and having a pair of opposed electroded surfaces with the normal to the plane of each of said surfaces substantially coinciding with the X-axis of the crystalline substance.

4. A piezoelectric device comprising: a piezoelectrically sensitive section, cut from a single crystal of sorbitol hexaacetate, and having a pair of opposed electroded surfaces oriented substantially parallel to the Y-axis of the crystalline substance and with the normal to the plane of each of said surfaces inclined substantially +6° from the X-axis of the crystalline substance.

5. A piezoelectric device comprising: a section cut from a single crystal of sorbitol hexaacetate, having a pair of opposed electroded surfaces, and piezoelectrically sensitive to a thickness-shear mode of motion of said crystal section.

6. A piezoelectric device for transducing between the types of energy which are classified as electrical and mechanical, comprising: a piezoelectrically sensitive section cut from a single crystal of sorbitol hexaacetate; means for applying energy of one of said types to said crystal section; and means dependent upon the effect of said applied energy upon said crystal section for deriving and utilizing energy of said other type.

7. A piezoelectric device for transducing between the types of energy which are classified as electrical and mechanical, comprising: a piezoelectrically sensitive section cut from a single crystal of sorbitol hexaacetate; means for applying energy of one of said types to said crystal section; and means dependent upon the effect of said applied energy upon said crystal section for deriving and utilizing energy of said other type; said mechanical energy being associated with motion of said crystal section in a thickness-shear mode.

8. A piezoelectric device comprising: a piezoelectrically sensitive resonator section, cut from a single crystal of sorbitol hexaacetate, and having a pair of opposed electroded surfaces oriented substantially parallel to the Y-axis of the crystalline substance and with the normal to the plane of each of said surfaces inclined substantially +6° from the X-axis of the crystalline substance; and electrical circuit means for exciting said resonator section so as to utilize the frequency-selective characteristics thereof.

HANS JAFFE.

References Cited in the file of this patent

UNITED STATES PATENTS

| Number | Name | Date |
|---|---|---|
| 1,824,777 | Harrison | Sept. 29, 1931 |
| 2,485,129 | Baerwald | Oct. 18, 1949 |
| 2,485,130 | Baerwald | Oct. 18, 1949 |
| 2,485,131 | Baerwald | Oct. 18, 1949 |
| 2,485,132 | Baerwald | Oct. 18, 1949 |
| 2,490,216 | Jaffe | Dec. 6, 1949 |
| 2,493,144 | Jaffe | Jan. 3, 1950 |

OTHER REFERENCES

Article by Bruzau, pages 445–459 of Elec. Communications, vol. 23, No. 4, 1946.